United States Patent
Kawamura (10) Patent No.: US 11,763,501 B2
(45) Date of Patent: Sep. 19, 2023

(54) RADIOGRAPHIC IMAGE PROCESSING DEVICE, RADIOGRAPHIC IMAGE PROCESSING METHOD, AND RADIOGRAPHIC IMAGE PROCESSING PROGRAM

(71) Applicant: FUJIFILM Corporation, Tokyo (JP)

(72) Inventor: Takahiro Kawamura, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 298 days.

(21) Appl. No.: 17/359,826

(22) Filed: Jun. 28, 2021

(65) Prior Publication Data

US 2022/0036606 A1 Feb. 3, 2022

(30) Foreign Application Priority Data

Jul. 30, 2020 (JP) .................................. 2020-129561

(51) Int. Cl.
*G06T 7/00* (2017.01)
*G06T 11/00* (2006.01)

(52) U.S. Cl.
CPC ....... *G06T 11/005* (2013.01); *G06T 2211/408* (2013.01)

(58) Field of Classification Search
CPC ..... G06T 11/005; G06T 7/136; G06T 1/0007; G06T 7/0012; G06T 5/50; G06T 7/11; A61B 6/505; A61B 6/5217
See application file for complete search history.

(56) References Cited

U.S. PATENT DOCUMENTS

| 10,022,462 | B2 * | 7/2018 | Cesati .................. C07D 407/12 |
| 2011/0305405 | A1 | 12/2011 | Kawamura |
| 2015/0379711 | A1 | 12/2015 | Imai |
| 2016/0140720 | A1 | 5/2016 | Naito |
| 2018/0240224 | A1 | 8/2018 | Fukuda |
| 2021/0177269 | A1 * | 6/2021 | Kajita .................. A61B 5/0095 |

FOREIGN PATENT DOCUMENTS

| JP | 2011-255060 A | 12/2011 |
| JP | 2014-207958 A | 11/2014 |
| JP | 2015-043959 A | 3/2015 |
| JP | 2018-134205 A | 8/2018 |

OTHER PUBLICATIONS

An Office Action; "Notice of Reasons for Refusal," mailed by the Japanese Patent Office dated May 30, 2023, which corresponds to Japanese Patent Application No. 2020-129561 and is related to U.S. Appl. No. 17/359,826; with English language translation.

* cited by examiner

*Primary Examiner* — Phuoc H Doan
(74) *Attorney, Agent, or Firm* — Studebaker & Brackett PC (57) ABSTRACT

A processor acquires at least one radiographic image of a subject including a plurality of compositions and acquires a composition ratio of the subject. The processor sets an attenuation coefficient of radiation used in a case in which the radiographic image is acquired for each pixel of the radiographic image according to the composition ratio. The processor performs image processing on the radiographic image using the set attenuation coefficient.

9 Claims, 7 Drawing Sheets

RADIOGRAPHIC IMAGE PROCESSING DEVICE, RADIOGRAPHIC IMAGE PROCESSING METHOD, AND RADIOGRAPHIC IMAGE PROCESSING PROGRAM

CROSS REFERENCE TO RELATED APPLICATIONS

The present application claims priority under 35 U.S.C. § 119 to Japanese Patent Application No. 2020-129561 filed on Jul. 30, 2020. The above application is hereby expressly incorporated by reference, in its entirety, into the present application.

BACKGROUND

Technical Field

The present disclosure relates to a radiographic image processing device, a radiographic image processing method, and a radiographic image processing program that perform image processing on a radiographic image.

Related Art

In the related art, an energy subtraction process is known which uses two radiographic images obtained by irradiating a subject with two types of radiation having different energy distributions, using the fact that the amount of attenuation of the transmitted radiation varies depending on a substance constituting the subject. The energy subtraction process is a method which makes pixels of the two radiographic images obtained as described above correspond to each other, multiplies the corresponding pixels by an appropriate weighting coefficient, and performs subtraction to acquire an image obtained by extracting a specific structure included in the radiographic image. In a case in which the energy subtraction process is performed to derive a soft part image obtained by extracting a soft part from, for example, the radiographic image of the chest, it is possible to observe shadows that appear in the soft part without being disturbed by a bone part. On the contrary, in a case in which a bone part image obtained by extracting a bone part is derived, it is possible to observe shadows that appear in the bone part without being disturbed by the soft part.

Further, in particular, in a case in which the thickness of the subject is large at the time of acquiring the radiographic image of the subject, there is a problem that radiation is scattered in the subject to generate scattered rays and the contrast of the acquired radiographic image is reduced by the generated scattered rays. Therefore, a scattered ray removal process for removing a scattered ray component included in the radiographic image is performed (see, for example, JP2015-043959A and JP2014-207958A).

However, in a case in which the energy subtraction process is performed, weighting coefficients for two radiographic images acquired by radiation having different energy distributions are derived on the basis of the attenuation coefficients of each of the soft part and the bone part for the radiation having different energy distributions. Further, in a case in which the scattered ray removal process is performed, the scattered ray removal process is performed by deriving a scattered ray component of the radiographic image on the basis of a radiation attenuation coefficient for the subject and subtracting the derived scattered ray component from the radiographic image.

Here, the radiation attenuation coefficient for deriving the weighting coefficient used in a case in which the energy subtraction process is performed is calculated by, for example, presumption on the basis of a low-energy image acquired by low-energy radiation having a low energy distribution. Therefore, in a case in which the energy subtraction process is performed, the same radiation attenuation coefficient is used as the weighting coefficient in all of the pixels of the radiographic image. In addition, in a case in which the scattered ray removal process is performed, it is assumed that the entire subject consists of soft tissues, and the scattered ray component is estimated using a radiation attenuation coefficient for the soft tissues in all of the pixels of the radiographic image.

However, the thickness of the substance in the subject varies depending on the location of the subject. Further, as described above, the radiation attenuation coefficient varies depending on the thickness of the substance in the subject. Here, in the human body as the subject, the thicknesses of the soft part and the bone part are not constant depending on the location of the human body. In addition, the soft part includes muscle and fat, and the proportion of muscle and fat varies depending on the location of the subject. Therefore, in the energy subtraction process, in a case in which the same radiation attenuation coefficient is used as the weighting coefficient in all of the pixels, it is difficult to completely remove an unnecessary structure in the acquired bone part image and soft part image. Further, in the scattered ray removal process, in a case in which the same radiation attenuation coefficient is used as the weighting coefficient in all of the pixels, it is difficult to remove the scattered ray components with high accuracy.

SUMMARY OF THE INVENTION

The present disclosure has been made in view of the above-mentioned problems, and an object of the present disclosure is to perform image processing on a radiographic image with high accuracy.

According to an aspect of the present disclosure, there is provided a radiographic image processing device comprising at least one processor. The processor is configured to: acquire at least one radiographic image of a subject including a plurality of compositions; acquire a composition ratio of the subject; set an attenuation coefficient of radiation used in a case in which the radiographic image is acquired for each pixel of the radiographic image according to the composition ratio; and perform image processing on the radiographic image using the set attenuation coefficient.

In addition, in the radiographic image processing device according to the aspect of the present disclosure, the processor may be configured to perform, as the image processing, a scattered ray removal process that removes a scattered ray component of the radiation included in the radiographic image.

Further, in the radiographic image processing device according to the aspect of the present disclosure, the processor may be configured to: acquire two radiographic images based on radiation that has different energy distributions and has been transmitted through the subject; and perform, as the image processing, an energy subtraction process between corresponding pixels of the two radiographic images using a weighting coefficient based on the attenuation coefficient.

Further, in the radiographic image processing device according to the aspect of the present disclosure, the processor may be configured to: acquire two radiographic images based on radiation that has different energy distributions and has been transmitted through the subject; derive a body thickness of the subject as a first body thickness and a second body thickness for each pixel of each of the two radiographic images; and derive the composition ratio of the subject for each pixel of the radiographic images on the basis of the first body thickness and the second body thickness.

Further, in the radiographic image processing device according to the aspect of the present disclosure, the processor may be configured to derive the composition ratio on the basis of a difference between the first body thickness and the second body thickness.

Further, in the radiographic image processing device according to the aspect of the present disclosure, the processor may be configured to: derive the first body thickness and the second body thickness on the basis of the attenuation coefficient of the radiation having each of the different energy distributions for each of the plurality of compositions; derive the first body thickness and the second body thickness while changing a thickness of the composition and the attenuation coefficient for each composition; and derive the composition ratio on the basis of a thickness of the composition at which a difference between the first body thickness and the second body thickness is equal to or less than a predetermined threshold value.

Further, in the radiographic image processing device according to the aspect of the present disclosure, the plurality of compositions may be muscle and fat.

According to another aspect of the present disclosure, there is provided a radiographic image processing method comprising: acquiring at least one radiographic image of a subject including a plurality of compositions; acquiring a composition ratio of the subject; setting an attenuation coefficient of radiation used in a case in which the radiographic image is acquired for each pixel of the radiographic image according to the composition ratio; and performing image processing on the radiographic image using the set attenuation coefficient.

In addition, a program that causes a computer to perform the radiographic image processing method according to the aspect of the present disclosure may be provided.

According to the present disclosure, it is possible to perform image processing on a radiographic image with high accuracy.

DETAILED DESCRIPTION

Figure 1:
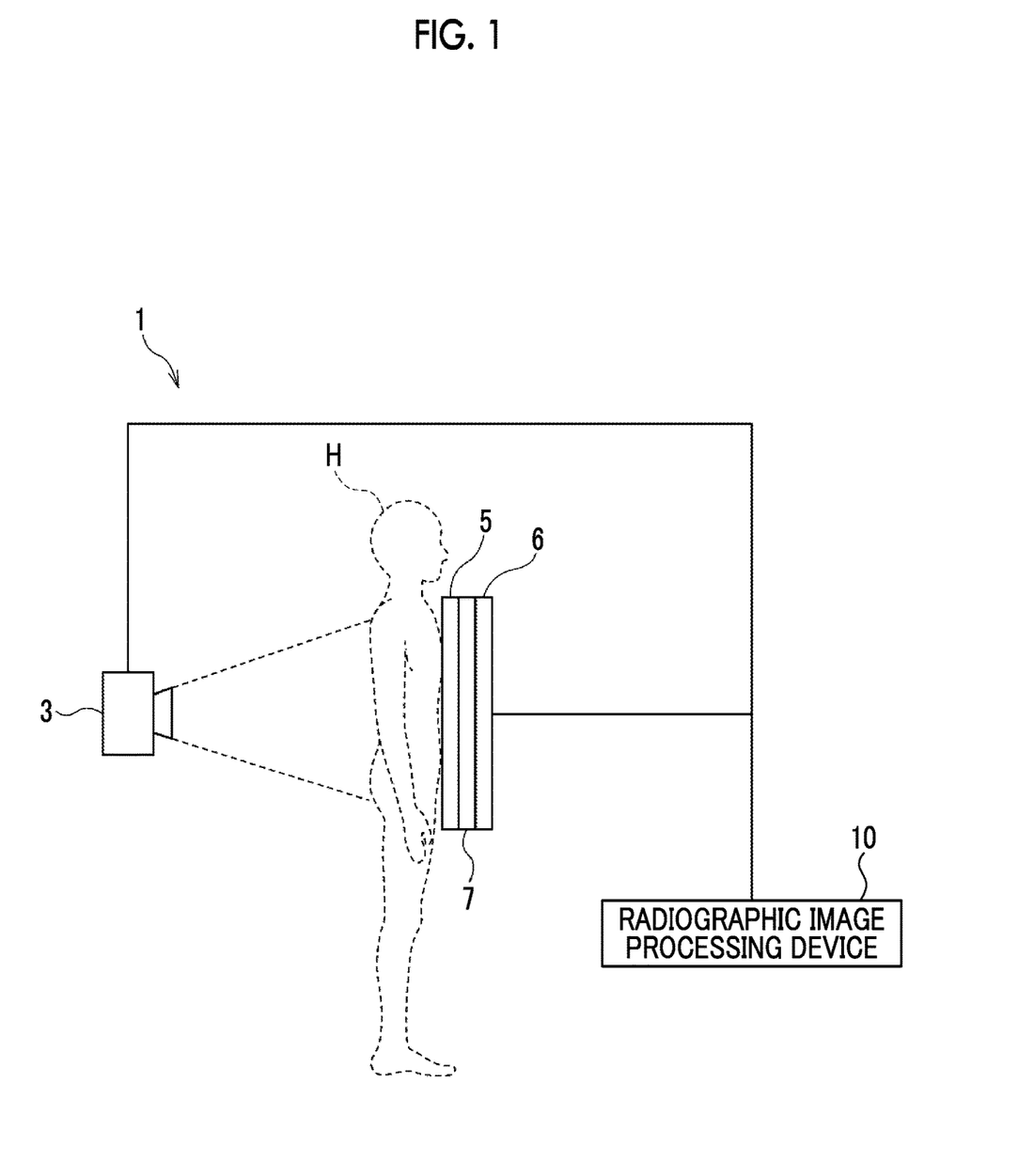
FIG. 1 is a block diagram schematically illustrating a configuration of a radiography system to which a radiographic image processing device according to an embodiment of the present disclosure is applied.

Hereinafter, embodiments of the present disclosure will be described with reference to the drawings. FIG. 1 is a block diagram schematically illustrating a configuration of a radiography system to which a radiographic image processing device according to an embodiment of the present disclosure is applied. As illustrated in FIG. 1, the radiography system according to this embodiment comprises an imaging apparatus 1 and a radiographic image processing device 10 according to this embodiment.

The imaging apparatus 1 performs energy subtraction using a so-called one-shot method that irradiates a first radiation detector 5 and a second radiation detector 6 with radiation, such as X-rays which have been emitted from a radiation source 3 and transmitted through a subject H, while changing energy. At the time of imaging, as illustrated in FIG. 1, the first radiation detector 5, a radiation energy conversion filter 7 that consists of, for example, a copper plate, and the second radiation detector 6 are disposed in this order from the side closer to the radiation source 3, and the radiation source 3 is driven. In addition, the first and second radiation detectors 5 and 6 and the radiation energy conversion filter 7 come into close contact with each other.

With this configuration, the first radiation detector 5 acquires a first radiographic image G1 of the subject H obtained by low-energy radiation including so-called soft rays. Further, the second radiation detector 6 acquires a second radiographic image G2 of the subject H obtained by high-energy radiation excluding soft rays. The first and second radiographic images are input to the radiographic image processing device 10. Both the first radiographic image G1 and the second radiographic image G2 are front images including the chest and abdomen of the subject H.

The first and second radiation detectors 5 and 6 can repeatedly perform the recording and reading of a radiographic image and may be a so-called direct-type radiation detector that directly receives the emitted radiation and generates charge or a so-called indirect-type radiation detector that converts radiation into visible light and then converts the visible light into a charge signal. In addition, as a method for reading a radiographic image signal, it is desirable to use a so-called thin film transistor (TFT) reading method which turns on and off a TFT switch to read a radiographic image signal or a so-called optical reading method which emits reading light to read a radiographic image signal. However, the present disclosure is not limited thereto and other methods may be used.

Figure 2:
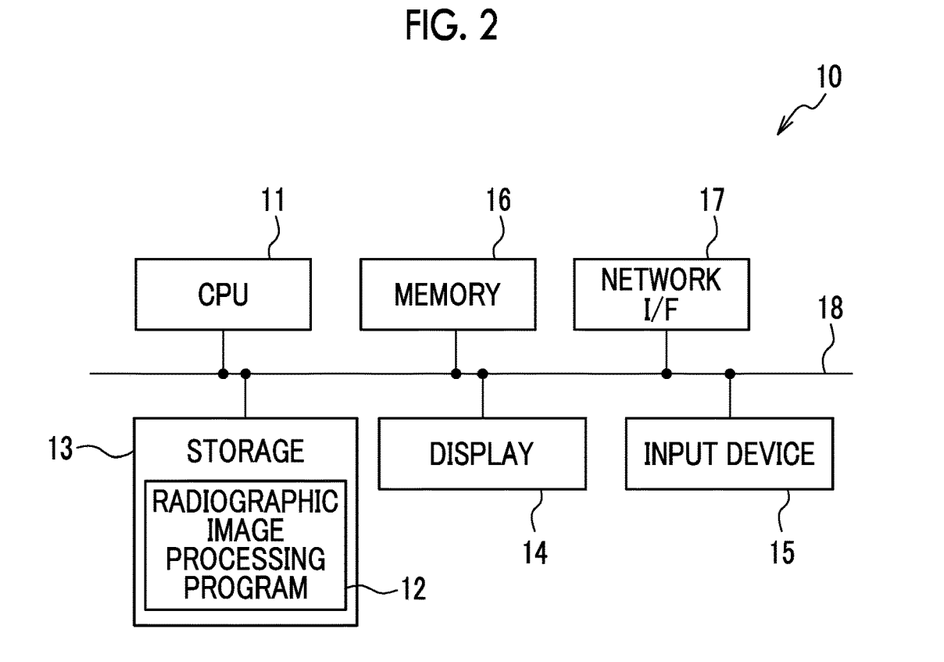
FIG. 2 is a diagram schematically illustrating a configuration of the radiographic image processing device according to the embodiment of the present disclosure.

Next, the radiographic image processing device according to this embodiment will be described. First, the hardware configuration of the radiographic image processing device according to this embodiment will be described with reference to FIG. 2. As illustrated in FIG. 2, the radiographic image processing device 10 is a computer, such as a workstation, a server computer, or a personal computer, and comprises a central processing unit (CPU) 11, a non-volatile storage 13, and a memory 16 as a temporary storage area. In addition, the radiographic image processing device 10 comprises a display 14, such as a liquid crystal display, an input device 15, such as a keyboard and a mouse, and a network interface (I/F) 17 that is connected to a network. The CPU 11, the storage 13, the display 14, the input device 15, the memory 16, and the network I/F 17 are connected to a bus 18. In addition, the CPU 11 is an example of a processor according to the present disclosure.

The storage 13 is implemented by, for example, a hard disk drive (HDD), a solid state drive (SSD), and a flash memory. A radiographic image processing program 12 installed in the radiographic image processing device 10 is stored in the storage 13 as a storage medium. The CPU 11 reads the radiographic image processing program 12 from the storage 13, expands the radiographic image processing program 12 in the memory 16, and executes the expanded radiographic image processing program 12.

In addition, the radiographic image processing program 12 is stored in a storage device of a server computer connected to the network or a network storage so as to be accessed from the outside and is downloaded and installed in the computer forming the radiographic image processing device 10 on demand. Alternatively, the radiographic image processing program 12 is recorded on a recording medium, such as a digital versatile disc (DVD) or a compact disc read only memory (CD-ROM), is distributed, and is installed in the computer forming the radiographic image processing device 10 from the recording medium.

Figure 3:
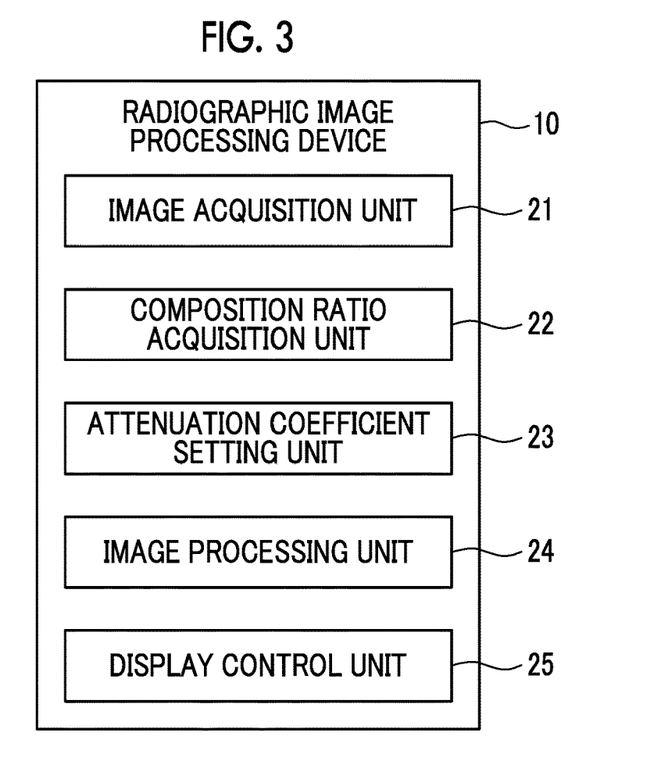
FIG. 3 is a diagram illustrating a functional configuration of the radiographic image processing device according to the embodiment of the present disclosure.

Next, the functional configuration of the radiographic image processing device according to this embodiment will be described. FIG. 3 is a diagram illustrating the functional configuration of the radiographic image processing device according to this embodiment. As illustrated in FIG. 3, the radiographic image processing device 10 comprises an image acquisition unit 21, a composition ratio acquisition unit 22, an attenuation coefficient setting unit 23, an image processing unit 24, and a display control unit 25. Then, the CPU 11 executes the radiographic image processing program 12 to function as the image acquisition unit 21, the composition ratio acquisition unit 22, the attenuation coefficient setting unit 23, the image processing unit 24, and the display control unit 25.

The image acquisition unit 21 directs the imaging apparatus 1 to capture the images of the subject H and acquires the first radiographic image G1 and the second radiographic image G2 which are the front images of the chest and abdomen of the subject H from the first and second radiation detectors 5 and 6. In a case in which the first radiographic image G1 and the second radiographic image G2 are acquired, imaging conditions, such as an irradiation dose of radiation, a tube voltage, and a source-to-image receptor distance (SID), are set. The set imaging conditions are stored in the storage 13.

The composition ratio acquisition unit 22 acquires the composition ratio of the subject H. In this embodiment, the composition ratio acquisition unit 22 derives the composition ratio of the subject H on the basis of the first and second radiographic images G1 and G2 to acquire the composition ratio. In this embodiment, it is assumed that a composition ratio of fat is derived as the composition ratio. Therefore, in the following description, it is assumed that, even though the subject H includes a bone part, the first and second radiographic images G1 and G2 do not include the bone part and include only a soft part for the sake of explanation.

First, the composition ratio acquisition unit 22 derives the body thickness of the subject H as a first body thickness and a second body thickness for each pixel of the first and second radiographic images G1 and G2, respectively, in order to derive the composition ratio. Specifically, assuming that a brightness distribution in the first radiographic image G1 is matched with the distribution of the body thickness of the subject H, the composition ratio acquisition unit 22 converts the pixel value of the first radiographic image G1 into a thickness using a radiation attenuation coefficient (hereinafter, simply referred to as an attenuation coefficient) in the muscle of the subject H to derive a first body thickness t1 of the subject H. Further, assuming that a brightness distribution in the second radiographic image G2 is matched with the distribution of the body thickness of the subject H, the composition ratio acquisition unit 22 converts the pixel value of the second radiographic image G2 into a thickness using the attenuation coefficient in the muscle of the subject H to derive a second body thickness t2 of the subject H.

Here, the radiation emitted from the radiation source 3 has an energy distribution. The attenuation coefficient of the radiation in the subject H also depends on the energy of the radiation. The radiation has the characteristic that, as an energy component becomes higher, the attenuation coefficient becomes smaller. Therefore, a so-called beam hardening phenomenon occurs in which, in the process of penetrating a substance, radiation loses a relatively large number of low-energy components and the proportion of high-energy components increases. Since the degree of beam hardening depends on a fat thickness tf and a muscle thickness tm in the subject H, an attenuation coefficient μf for fat and an attenuation coefficient μm for muscle can be defined as μf(tf, tm) and μm(tf, tm) which are non-linear functions of the fat thickness tf and the muscle thickness tm.

The first and second radiographic images G1 and G2 acquired by radiation with two different energy distributions as in this embodiment correspond to a low-energy image and a high-energy image, respectively. Therefore, in this embodiment, for the first radiographic image G1 which is the low-energy image, the attenuation coefficient for fat can be represented by μlf(tf, tm), and the attenuation coefficient for muscle can be represented by μlm(tf, tm). Further, for the second radiographic image G2 which is the high-energy image, the attenuation coefficient for fat can be represented by μhf(tf, tm), and the attenuation coefficient for muscle can be represented by μhm(tf, tm).

In addition, a pixel value G1(x, y) of each pixel of the first radiographic image G1 which is the low-energy image and a pixel value G2(x, y) of each pixel of the second radiographic image G2 which is the high-energy image are represented by the following Expressions (1) and (2) using a fat thickness tf(x, y), a muscle thickness tm(x, y), and attenuation coefficients μlf(x, y), μhf(x, y), μlm(x, y), and μhm(x, y) at the corresponding pixel position, respectively. In addition, in Expressions (1) and (2), (x, y) is omitted.

$$G1 = \mu lf \times tf + \mu lm \times tm \quad (1)$$

$$G2 = \mu hf \times tf + \mu hm \times tm \quad (2)$$

As described above, in this embodiment, in a case in which the first body thickness t1 and the second body thickness t2 are derived, the pixel values of the first radiographic image G1 and the second radiographic image G2 are converted into thicknesses using the attenuation coefficient for muscle in the subject H. Therefore, in this embodiment, the composition ratio acquisition unit 22 derives the first body thickness t1 and the second body thickness t2 using the following Expressions (3) and (4). Further, in Expressions (3) and (4), (x, y) is omitted.

$$t1 = G1/\mu lm \tag{3}$$

$$t2 = G2/\mu hm \tag{4}$$

In a case in which the subject H includes only muscle at the pixel position from which the first and second body thicknesses t1 and t2 are derived, the first body thickness t1 and the second body thickness t2 are equal to each other. However, the actual subject H includes both muscle and fat at the same pixel position of the first and second radiographic images G1 and G2. Therefore, the first and second body thicknesses t1 and t2 derived by Expressions (3) and (4) are not equal to the actual body thickness of the subject H. Further, for the first body thickness t1 derived from the first radiographic image G1 which is the low-energy image and the second body thickness t2 derived from the second radiographic image G2 which is the high-energy image, the first body thickness t1 is larger than the second body thickness t2.

Figure 4:
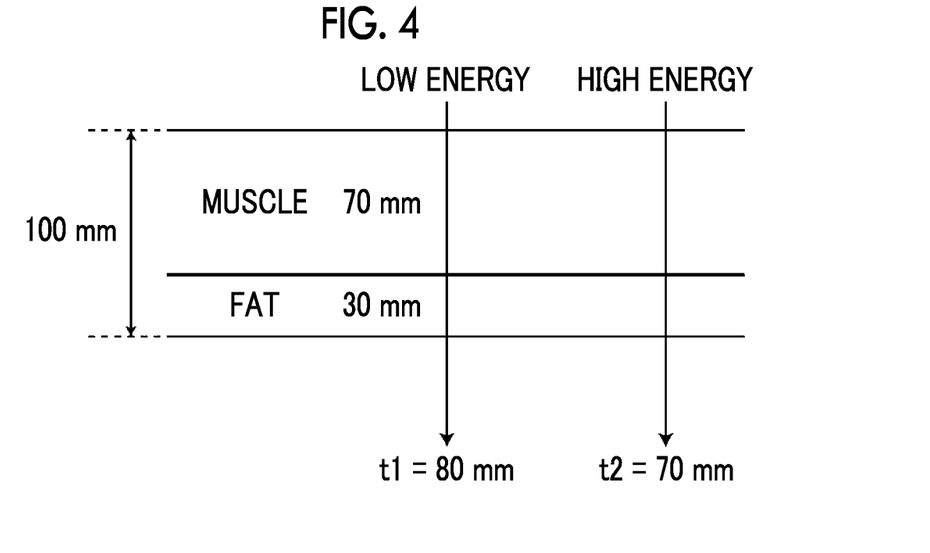
FIG. 4 is a diagram illustrating a difference between body thicknesses derived from a low-energy image and a high-energy image.

For example, it is assumed that the actual body thickness is 100 mm and the thicknesses of fat and muscle are 30 mm and 70 mm, respectively, as illustrated in FIG. 4. In this case, the first body thickness t1 derived from the first radiographic image G1 acquired by low-energy radiation is, for example, 80 mm, and the second body thickness t2 derived from the second radiographic image G2 acquired by high-energy radiation is, for example, 70 mm. Further, the difference between the first body thickness t1 and the second body thickness t2 becomes larger as the composition ratio of fat becomes higher.

Here, the difference between the first body thickness t1 and the second body thickness t2 changes depending on the composition ratio of fat and muscle in the subject H. Therefore, in this embodiment, the images of a subject model in which the composition ratio of fat is variously changed are captured with radiation having different energy distributions, and the body thicknesses are derived from two radiographic images acquired by the imaging. Then, a table in which the difference between the body thicknesses derived from the two radiographic images and the composition ratio of fat are associated with each other is created in advance and is stored in the storage 13.

Figure 5:
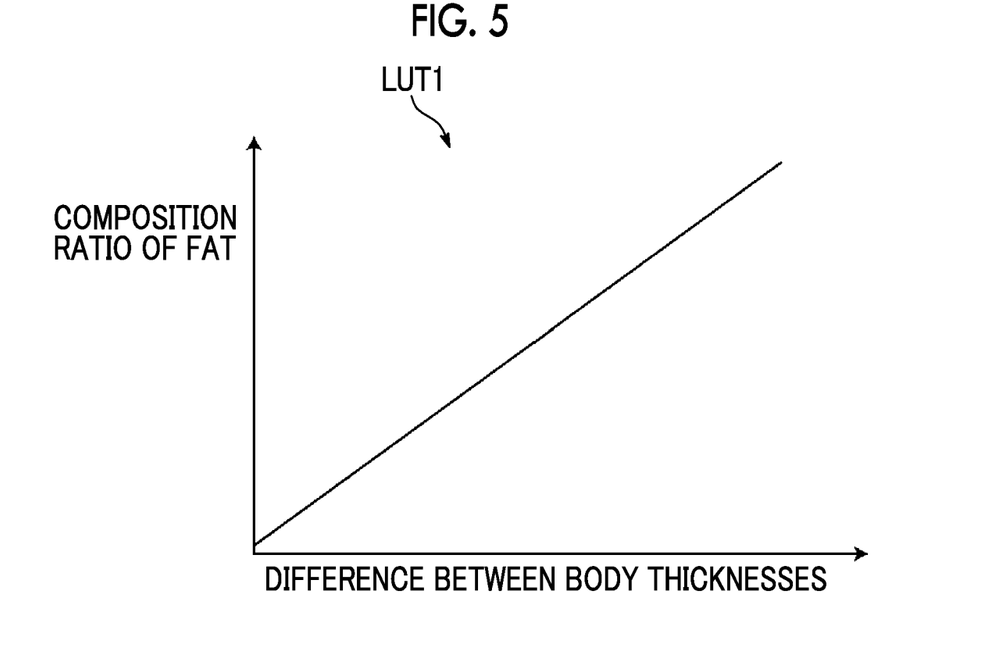
FIG. 5 is a diagram illustrating a table in which the difference between the body thicknesses derived from two radiographic images and a composition ratio of fat are associated with each other.

FIG. 5 is a diagram illustrating the table in which the difference between the body thicknesses derived from two radiographic images and the composition ratio of fat are associated with each other. As illustrated in FIG. 5, in a table LUT1, the horizontal axis is the difference between the body thicknesses derived from the two radiographic images and the vertical axis is the composition ratio of fat. As illustrated in FIG. 5, as the difference between the body thicknesses derived from the two radiographic images becomes larger, the composition ratio of fat becomes higher. In addition, the table in which the difference between the body thicknesses derived from the two radiographic images and the composition ratio of fat are associated with each other is prepared for each radiation energy distribution used at the time of imaging and is then stored in the storage 13.

The composition ratio acquisition unit 22 derives a difference between the derived first and second body thicknesses t1 and t2 and derives a composition ratio R(x, y) of fat with reference to the table LUT1 stored in the storage 13. In addition, the derived composition ratio R(x, y) of fat can be subtracted from 100% to derive the composition ratio of muscle.

The attenuation coefficient setting unit 23 sets the attenuation coefficient of radiation used in a case in which the first and second radiographic images G1 and G2 are acquired for each pixel of the first and second radiographic images G1 and G2 according to the composition ratio R(x, y) of fat. Specifically, an attenuation coefficient for the soft part of the subject H is set. Here, in this embodiment, the first radiographic image G1 corresponds to a low-energy image, and the second radiographic image G2 corresponds to a high-energy image. Therefore, the attenuation coefficient setting unit 23 derives an attenuation coefficient $\mu ls(x, y)$ for a soft part in the low-energy image and an attenuation coefficient $\mu hs(x, y)$ for a soft part in the high-energy image using the following Expressions (5) and (6). In addition, in Expressions (5) and (6), (x, y) is omitted. Further, $\mu lm$ is an attenuation coefficient for muscle in the low-energy image, $\mu lf$ is an attenuation coefficient for fat in the low-energy image, $\mu hm$ is an attenuation coefficient for muscle in the high-energy image, and $\mu hf$ is an attenuation coefficient for fat in the high-energy image.

$$\mu ls = (1-R) \times \mu lm + R \times \mu lf \tag{5}$$

$$\mu hs = (1-R) \times \mu hm + R \times \mu hf \tag{6}$$

The image processing unit 24 performs image processing on the radiographic images using the attenuation coefficients $\mu ls$ and $\mu hs$ set by the attenuation coefficient setting unit 23. In this embodiment, the image processing unit 24 performs, as the image processing, an energy subtraction process between the corresponding pixels of the first radiographic image G1 and the second radiographic image G2 using weighting coefficients based on the attenuation coefficients. Specifically, as represented by the following Expressions (7) and (8), a subtraction process which performs weighting and subtraction between the corresponding pixels of the first and second radiographic images G1 and G2 is performed to derive a soft part image Gs obtained by extracting a soft part of the subject H and a bone part image Gb obtained by extracting a bone part of the subject H. In Expressions (7) and (8), α and β are weighting coefficients.

$$Gs(x,y) = \alpha \cdot G2(x,y) - G1(x,y) \tag{7}$$

$$Gb(x,y) = \beta \cdot G2(x,y) - G1(x,y) \tag{8}$$

The weighting coefficient α for deriving the soft part image Gs in Expression (7) is derived by $\alpha = \mu lb/\mu hb$. The weighting coefficient β for deriving the bone part image Gb in Expression (8) is derived by $\beta = \mu ls/\mu hs$ using the attenuation coefficient set by the attenuation coefficient setting unit 23. Here, $\mu lb$ is an attenuation coefficient for the bone part in the low-energy image, and $\mu hb$ is an attenuation coefficient for the bone part in the high-energy image. Further, in this embodiment, the attenuation coefficients $\mu lb$ and $\mu hb$ for the bone part are prepared in advance and are stored in the storage 13.

Figure 6:
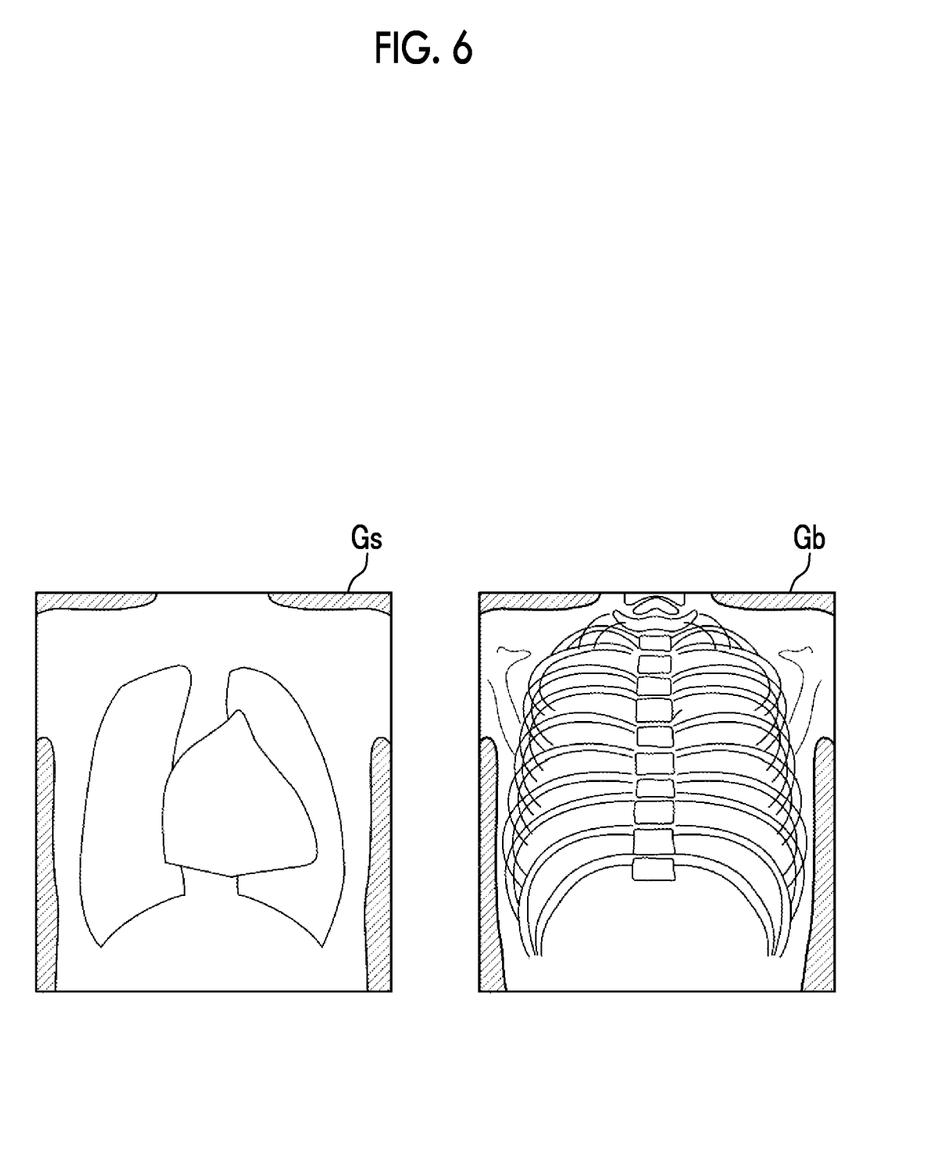
FIG. 6 is a diagram illustrating a soft part image and a bone part image.

FIG. 6 is a diagram illustrating the soft part image Gs and the bone part image Gb. As illustrated in FIG. 6, the soft part image Gs is obtained by extracting the soft part of the subject H. Further, the bone part image Gb is obtained by extracting the bone part of the subject H.

The display control unit 25 displays the soft part image Gs and the bone part image Gb on the display 14.

Figure 7:
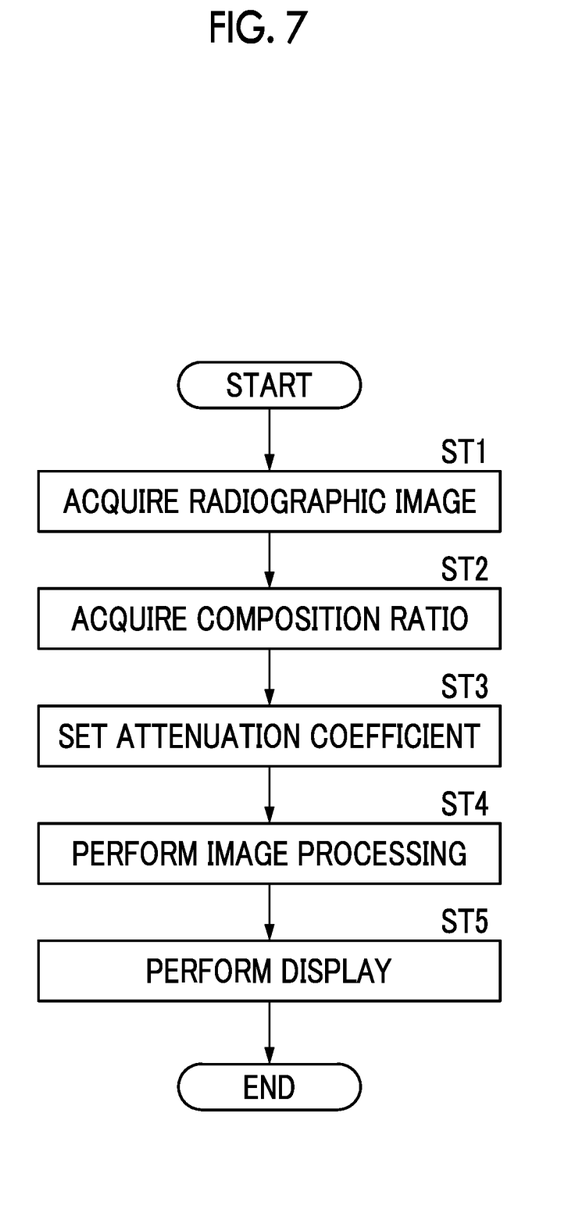
FIG. 7 is a flowchart illustrating a process performed in this embodiment.

Next, a process performed in this embodiment will be described. FIG. 7 is a flowchart illustrating the process performed in this embodiment. In addition, it is assumed that the first and second radiographic images G1 and G2 are acquired by imaging and are then stored in the storage 13.

In a case in which an instruction to start the process is input from the input device 15, the image acquisition unit 21 acquires the first and second radiographic images G1 and G2 from the storage 13 (radiographic image acquisition; Step ST1). Then, the composition ratio acquisition unit 22 acquires the composition ratio of fat in the subject H (Step ST2).

Then, the attenuation coefficient setting unit 23 sets the attenuation coefficient of radiation used in a case in which the first and second radiographic images G1 and G2 are acquired for each pixel of the first and second radiographic images G1 and G2 according to the composition ratio R(x, y) of fat (Step ST3). Further, the image processing unit 24 performs, as image processing, an energy subtraction process between the corresponding pixels of the first radiographic image G1 and the second radiographic image G2 on the basis of the set attenuation coefficient (Step ST4). Then, the display control unit 25 displays the soft part image and the bone part image acquired by the image processing on the display 14 (Step ST5). Then, the process ends.

As such, in this embodiment, the attenuation coefficient of radiation used in a case in which the radiographic images are acquired is set for each pixel of the radiographic images according to the composition ratio of the subject H, and image processing is performed on the radiographic images using the set attenuation coefficient. Therefore, it is possible to remove an unnecessary soft tissue with higher accuracy in the bone part image Gb acquired by image processing, particularly, the energy subtraction process. As a result, according to this embodiment, it is possible to perform image processing on the radiographic image with high accuracy.

In addition, in the above-described embodiment, the energy subtraction process is performed as the image processing performed by the image processing unit 24. However, the present disclosure is not limited thereto. The image processing unit 24 may perform a scattered ray removal process for removing scattered ray components included in the first radiographic image G1 and the second radiographic image G2. Hereinafter, the scattered ray removal process will be described. For example, the method disclosed in JP2015-043959A can be used as the scattered ray removal process. Hereinafter, the scattered ray removal process in a case in which the method described in JP2015-043959A is used will be described. In a case in which the method described in JP2015-043959A is used, the derivation of the body thickness distribution of the subject H and the derivation of scattered ray components for removing scattered ray components are performed at the same time.

In addition, in a case in which the scattered ray removal process is performed, the image processing unit 24 uses the first radiographic image G1 acquired by the first radiation detector 5 closer to the subject H. However, the second radiographic image G2 acquired by the second radiation detector 6 farther away from the subject H may be used. Further, the soft part image Gs in which the soft part of the subject H included in the first radiographic image G1 and the second radiographic image G2 has been highlighted may be generated by Expression (7), and the body thickness distribution of the subject H may be derived using the soft part image Gs. Furthermore, even in a case in which any of the images is used, a low-frequency image indicating a low-frequency component of the image may be generated, and the body thickness distribution may be derived using the low-frequency image.

First, the image processing unit 24 acquires a virtual model K1 of the subject H having an initial body thickness distribution Ts(x, y). The virtual model K1 is data which virtually indicates the subject H and in which the body thickness according to the initial body thickness distribution Ts(x, y) is associated with the coordinate position of each pixel of the first radiographic image G1. In addition, the virtual model K1 of the subject H having the initial body thickness distribution Ts(x, y) is stored in the storage 13 in advance. However, the virtual model K1 may be acquired from an external server storing the virtual model K1.

Then, the image processing unit 24 derives an estimated primary ray image Ip(x, y) which is obtained by estimating a primary ray image obtained by capturing the image of the virtual model K1 and an estimated scattered ray image Is(x, y) which is obtained by estimating a scattered ray image obtained by capturing the image of the virtual model K1, on the basis of the virtual model K1, as represented by the following Expressions (9) and (10). Further, as represented by the following Expression (11), the image processing unit 24 derives a composite image of the estimated primary ray image Ip(x, y) and the estimated scattered ray image Is(x, y) as an estimated image Im(x, y) which is obtained by estimating the first radiographic image G1 obtained by capturing the image of the subject H.

$$Ip(x,y)=Io(x,y)\times\exp(-\mu ls\times T(x,y)) \qquad (9)$$

$$Is(x,y)=Io(x,y)*S\sigma(T(x,y)) \qquad (10)$$

$$Im(x,y)=Is(x,y)+Ip(x,y) \qquad (11)$$

Here, (x, y) is the coordinate of the pixel position of the first radiographic image G1, Ip(x, y) is a primary ray component at the pixel position (x, y), Is(x, y) is a scattered ray component at the pixel position (x, y), Io(x, y) is an incident dose on the surface of the subject H at the pixel position (x, y), $\mu ls$ is an attenuation coefficient of the subject H, and $S\sigma(T(x, y))$ is a convolutional kernel indicating scattering characteristics corresponding to the body thickness distribution T(x, y) of the subject H at the pixel position (x, y). In addition, in the first derivation of the estimated image Im(x, y), the initial body thickness distribution Ts(x, y) is used as the body thickness distribution T(x, y) in Expressions (9) and (10). Expression (9) is based on a known exponential attenuation law, and Expression (10) is based on the method disclosed in "J M Boon et al, An analytical model of the scattered radiation distribution in diagnostic radiology, Med. Phys. 15(5), September/October 1988" (Reference Literature 1). Further, the incident dose Io(x, y) on the surface of the subject H is an irradiation dose that is derived on the basis of the imaging conditions. Furthermore, the attenuation coefficient $\mu ls$ of the subject H in Expression (9) is the attenuation coefficient for the soft tissue in the low-energy image of the subject H set by the attenuation coefficient setting unit 23.

In addition, * in Expression (10) is an operator indicating a convolution operation. The properties of the kernel change depending on, for example, the distribution of the irradiation field in the imaging apparatus 1, the distribution of the composition of the subject H, an irradiation dose at the time of imaging, a tube voltage, an imaging distance, and the characteristics of the radiation detectors 5 and 6, in addition to the body thickness of subject H. According to the method disclosed in Reference Literature 1, the scattered rays can be approximated by the convolution of a point spread function ($S\sigma(T(x, y))$ in Expression (11)) for the primary rays. In addition, $S\sigma(T(x, y))$ can be experimentally calculated according to, for example, irradiation field information, subject information, and imaging conditions.

In this embodiment, Sσ(T(x, y)) may be calculated on the basis of irradiation field information, subject information, and imaging conditions at the time of imaging. However, a table in which various kinds of irradiation field information, various kinds of subject information, and various imaging conditions are associated with Sσ(T(x, y)) may be stored in the storage 13, and Sσ(T(x, y)) may be calculated on the basis of the irradiation field information, the subject information, and the imaging conditions at the time of imaging with reference to the table. In addition, Sσ(T(x, y)) may be approximated by T(x, y).

Then, the image processing unit 24 corrects the initial body thickness distribution Ts(x, y) of the virtual model K1 such that the difference between the estimated image Im and the first radiographic image G1 is reduced. The image processing unit 24 repeats the generation of the estimated image Im using the corrected body thickness distribution T(x, y) and the correction of the body thickness distribution T(x, y) until the difference between the estimated image Im and the first radiographic image G1 satisfies a predetermined end condition. The image processing unit 24 subtracts the scattered ray component Is(x, y) derived by Expression (10) in a case in which the end condition is satisfied from the first radiographic image G1. Therefore, the scattered ray component included in the first radiographic image G1 is removed.

In addition, in a case in which the scattered ray removal process is performed, the image processing unit 24 can perform the scattered ray removal process on the second radiographic image G2 similarly to the first radiographic image G1.

Further, the image processing unit 24 may perform the scattered ray removal process on the first radiographic image G1 and the second radiographic image G2 and then perform the energy subtraction process using the first radiographic image G1 and the second radiographic image G2 subjected to the scattered ray removal process.

Furthermore, in the above-described embodiment, the composition ratio acquisition unit 22 derives the composition ratio of muscle and fat on the basis of the first and second radiographic images G1 and G2. However, the present disclosure is not limited thereto. For example, the body fat percentage of the subject H may be measured by a body composition analyzer, and the measured body fat percentage may be used as the composition ratio of fat. In this case, the measured composition ratio of fat may be stored in the storage 13, and the composition ratio acquisition unit 22 may acquire the composition ratio of fat from the storage 13 in a case in which image processing is performed.

Figure 8:
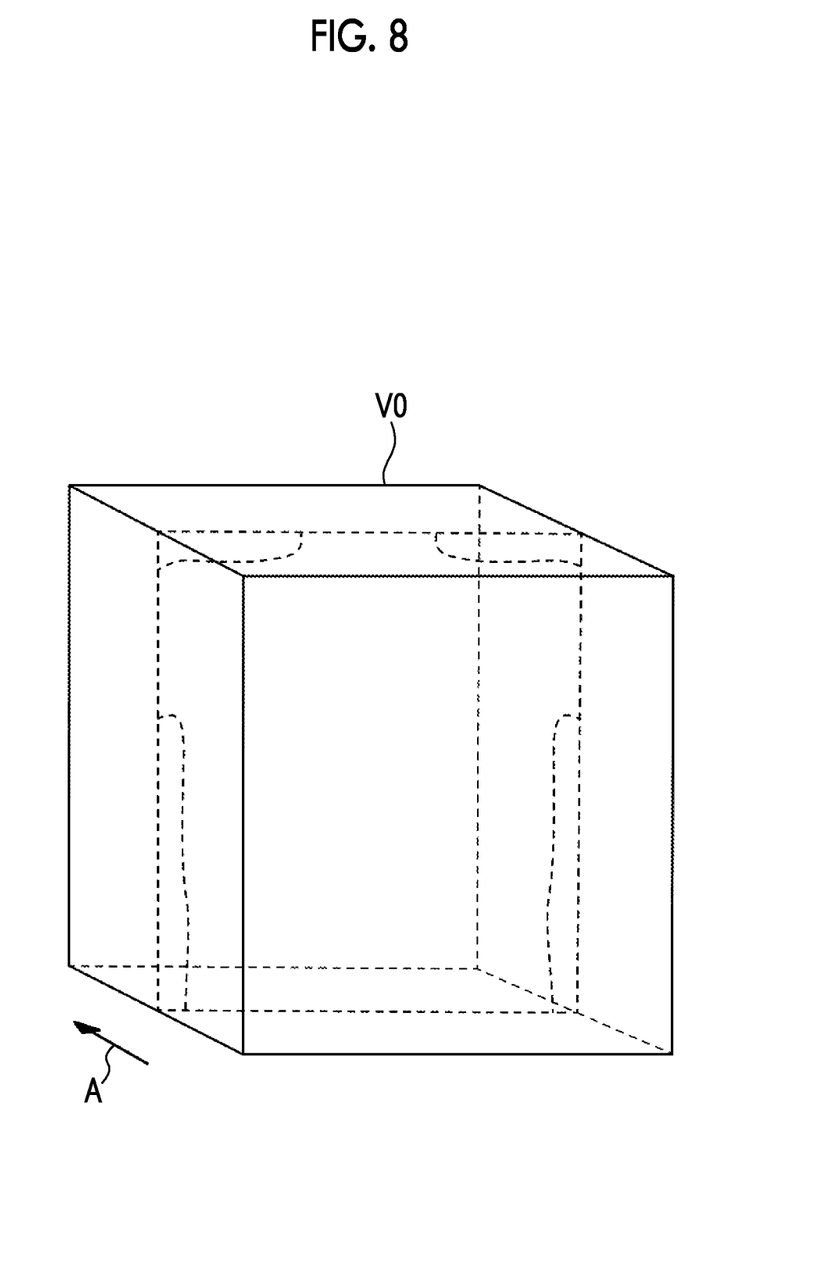
FIG. 8 is a diagram illustrating the derivation of the composition ratio using a CT image.

Further, the composition ratio acquisition unit 22 may acquire the composition ratio of fat using the CT image of the subject H acquired by a computed tomography (CT) apparatus. Here, in the CT image, the CT values of muscle and fat are distributed in different ranges. Specifically, the CT value of muscle is in the range of about 30 to 60 HU, and the CT value of fat is in the range of about −100 to −50 HU. The CT image is a three-dimensional image. Therefore, as illustrated in FIG. 8, the composition ratio acquisition unit 22 is disposed in the direction in which the subject H in a CT image VO is viewed from the front (the direction of an arrow A in FIG. 8), counts the number of pixels in the subject H as the number of body thickness pixels P0, and counts the number of pixels having a CT value in the range of fat among the number of body thickness pixels P0 as the number of fat pixels Pf. Then, the ratio Pf/P0 of the number of fat pixels Pf to the number of body thickness pixels P0 may be derived as the composition ratio of fat.

In addition, in the above-described embodiment, the composition ratio acquisition unit 22 may derive the composition ratio as follows. That is, the composition ratio acquisition unit 22 may derive the first body thickness t1 and the second body thickness t2 on the basis of the attenuation coefficients of radiation with different energy distributions for a plurality of compositions, may derive the first body thickness t1 and the second body thickness t2 while changing the thickness of the composition and the attenuation coefficient for each composition, and may derive the composition ratio on the basis of the thickness of the composition at which the difference between the first body thickness t1 and the second body thickness t2 is equal to or less than a predetermined threshold value Th1.

Here, the first body thickness t1 is the sum of the fat thickness tf and the muscle thickness tm. That is, t1=tf+tm is established. Since tm=t1−tf is established, Expression (1) can be transformed into the following Expression (12).

$$G1 = \mu lf \times tf + \mu lm \times (t1-tf) \tag{12}$$

In a case in which Expression (12) is solved for t1, the following Expression (13) is obtained.

$$t1 = \{G1 + (\mu lm - \mu lf) \times tf\}/\mu lm \tag{13}$$

Further, the second body thickness is t2=tf+tm. Therefore, in a case in which Expression (2) is transformed similarly to Expression (12) and is solved for t2, the following Expression (14) is obtained. In Expressions (12) to (14), (x, y) is omitted.

$$t2 = \{G2 + (\mu hm - \mu hf) \times tf\}/\mu hm \tag{14}$$

The composition ratio of fat can be derived by deriving the fat thickness tf such that the difference between t1 and t2 is reduced, preferably, t1 is equal to t2. However, since the attenuation coefficients μlf, μhf, μlm, and μhm are non-linear functions for the fat thickness tf and the muscle thickness tm, it is difficult to algebraically derive the fat thickness tf from Expressions (13) and (14). Therefore, the composition ratio derivation unit 22 derives the first body thickness t1 and the second body thickness t2 while changing the fat thickness tf and the attenuation coefficients μlf, μhf, μlm, and μhm. Then, the composition ratio derivation unit 22 derives the fat thickness tf at which the difference between the first body thickness t1 and the second body thickness t2 is equal to or less than the predetermined threshold value Th1, that is, |t1−t2|≤Th1 is satisfied and derives the composition ratio of fat on the basis of the fat thickness tf. In addition, it is preferable that the threshold value Th1 is as small as possible. It is more preferable that Th1=0 is established.

Specifically, in a case in which tf=0 and t1=t2 are established, all of the pixels (x, y) indicate muscle. Further, in a case in which tf=0 and t1≠t2 are established, the composition ratio derivation unit 22 searches for the fat thickness tf, at which |t1−t2|≤Th1 is satisfied, while changing the fat thickness tf to derive the fat thickness tf. Then, the composition ratio derivation unit 22 divides the derived fat thickness tf by the first body thickness t1 or the second body thickness t2 to derive the composition ratio of fat. In addition, the composition ratio of muscle can be derived by subtracting the derived composition ratio of fat from 100%.

Figure 9:
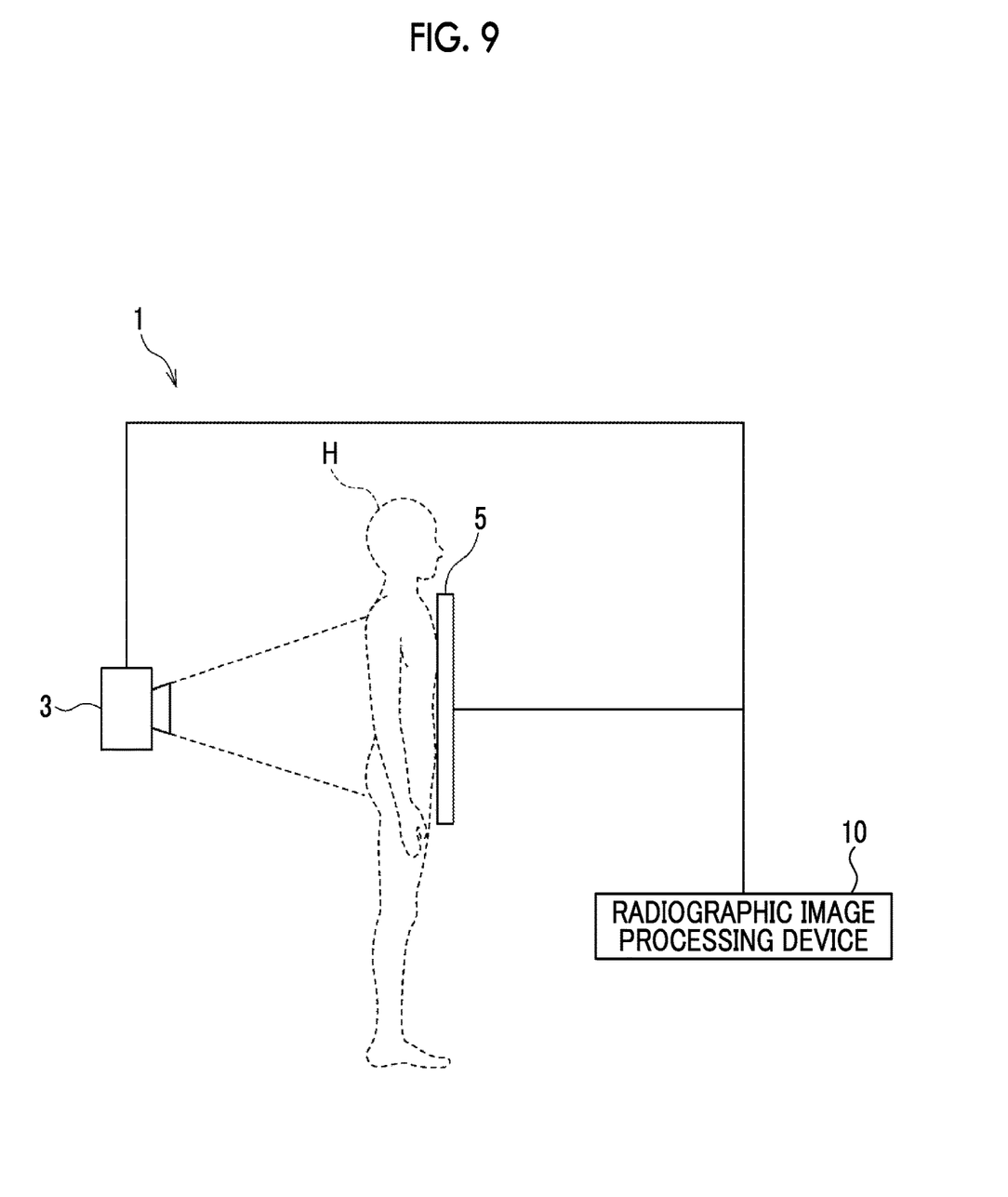
FIG. 9 is a block diagram schematically illustrating a configuration of a radiography system to which a radiographic image processing device according to another embodiment of the present disclosure is applied.

Further, in this embodiment, in a case in which the composition ratio is acquired by a body fat scale or is acquired from the CT image VO and the image processing is not the energy subtraction process but the scattered ray removal process, it is not necessary to acquire the first and second radiographic images G1 and G2 using the two radiation detectors 5 and 6 unlike the above-described embodiment. For example, as illustrated in FIG. 9, one radiographic image of the subject H may be acquired by only one radiation detector 5, an attenuation coefficient may be set according to the composition ratio, and the scattered ray removal process may be performed on the one acquired radiographic image using the set attenuation coefficient.

Further, in the above-described embodiment, in a case in which the energy subtraction process is performed as the image processing, the first and second radiographic images G1 and G2 are acquired by the one-shot method. However, the first and second radiographic images G1 and G2 may be acquired by a so-called two-shot method that performs imaging twice using only one radiation detector as illustrated in FIG. 9. Further, in the case of the two-shot method, the position of the subject H included in the first and second radiographic images G1 and G2 is likely to be shifted by the body movement of the subject H. Therefore, it is preferable to perform the process according to this embodiment after aligning the position of the subject in the first and second radiographic images G1 and G2. For example, the method disclosed in JP2011-255060A can be used as the positioning process. For example, the method disclosed in JP2011-255060A generates a plurality of first band images and a plurality of second band images indicating structures having different frequency bands for each of first and second radiographic images G1 and G2, acquires the amount of positional deviation between the corresponding positions in the first band image and the second band image of the corresponding frequency band, and registers the first radiographic image G1 and the second radiographic image G2 on the basis of the amount of positional deviation.

Further, in the above-described embodiment, the process of deriving the composition ratio is performed using the radiographic images acquired in the system that captures the first and second radiographic images G1 and G2 of the subject H using the first and second radiation detectors 5 and 6. However, the technology of the present disclosure may also be applied to a case in which the first and second radiographic images G1 and G2 are acquired by a storage phosphor sheet instead of the radiation detector. In this case, the first and second radiographic images G1 and G2 may be acquired by stacking two storage phosphor sheets, irradiating the storage phosphor sheets with radiation transmitted through the subject H such that the radiographic image information of the subject H is accumulated and recorded on each storage phosphor sheet, and photoelectrically reading the radiographic image information from each storage phosphor sheet. In addition, the two-shot method may also be used in a case in which the first and second radiographic images G1 and G2 are acquired using the storage phosphor sheets.

Further, the radiation in the above-described embodiment is not particularly limited. For example, α-rays or γ-rays can be used in addition to the X-rays.

In the above-described embodiment, for example, the following various processors can be used as a hardware structure of processing units performing various processes, such as the image acquisition unit 21, the composition ratio acquisition unit 22, the attenuation coefficient setting unit 23, the image processing unit 24, and the display control unit 25. The various processors include, for example, a CPU which is a general-purpose processor executing software (program) to function as various processing units as described above, a programmable logic device (PLD), such as a field programmable gate array (FPGA), which is a processor whose circuit configuration can be changed after manufacture, and a dedicated electric circuit, such as an application specific integrated circuit (ASIC), which is a processor having a dedicated circuit configuration designed to perform a specific process.

One processing unit may be configured by one of the various processors or a combination of two or more processors of the same type or different types (for example, a combination of a plurality of FPGAs or a combination of a CPU and an FPGA). Further, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As such, various processing units are configured by using one or more of the various processors as a hardware structure.

Furthermore, specifically, an electric circuit (circuitry) obtained by combining circuit elements, such as semiconductor elements, can be used as the hardware structure of the various processors.

What is claimed is:

1. A radiographic image processing device comprising:
at least one processor,
wherein the processor is configured to
acquire at least one radiographic image of a subject including a plurality of compositions,
acquire a composition ratio of the subject,
set an attenuation coefficient of radiation used in a case in which the radiographic image is acquired for each pixel of the radiographic image according to the composition ratio, and
perform image processing on the radiographic image using the set attenuation coefficient.

2. The radiographic image processing device according to claim 1,
wherein the processor is configured to perform, as the image processing, a scattered ray removal process that removes a scattered ray component of the radiation included in the radiographic image.

3. The radiographic image processing device according to claim 1,
wherein the processor is configured to
acquire two radiographic images based on radiation that has different energy distributions and has been transmitted through the subject, and
perform, as the image processing, an energy subtraction process between corresponding pixels of the two radiographic images using a weighting coefficient based on the attenuation coefficient.

4. The radiographic image processing device according to claim 1,
wherein the processor is configured to
acquire two radiographic images based on radiation that has different energy distributions and has been transmitted through the subject,
derive a body thickness of the subject as a first body thickness and a second body thickness for each pixel of each of the two radiographic images, and derive the composition ratio of the subject for each pixel of the radiographic images on the basis of the first body thickness and the second body thickness.

5. The radiographic image processing device according to claim 4,
wherein the processor is configured to derive the composition ratio on the basis of a difference between the first body thickness and the second body thickness.

6. The radiographic image processing device according to claim 4,
wherein the processor is configured to
derive the first body thickness and the second body thickness on the basis of the attenuation coefficient of the radiation having each of the different energy distributions for each of the plurality of compositions,
derive the first body thickness and the second body thickness while changing a thickness of the composition and the attenuation coefficient for each composition, and
derive the composition ratio on the basis of a thickness of the composition at which a difference between the first body thickness and the second body thickness is equal to or less than a predetermined threshold value.

7. The radiographic image processing device according to claim 1,
wherein the plurality of compositions are muscle and fat.

8. A radiographic image processing method comprising:
acquiring at least one radiographic image of a subject including a plurality of compositions;
acquiring a composition ratio of the subject;
setting an attenuation coefficient of radiation used in a case in which the radiographic image is acquired for each pixel of the radiographic image according to the composition ratio; and
performing image processing on the radiographic image using the set attenuation coefficient.

9. A non-transitory computer-readable storage medium that stores a radiographic image processing program that causes a computer to execute:
a procedure of acquiring at least one radiographic image of a subject including a plurality of compositions;
a procedure of acquiring a composition ratio of the subject;
a procedure of setting an attenuation coefficient of radiation used in a case in which the radiographic image is acquired for each pixel of the radiographic image according to the composition ratio; and
a procedure of performing image processing on the radiographic image using the set attenuation coefficient.

* * * * *